United States Patent
Yu et al.

(10) Patent No.: US 10,694,485 B2
(45) Date of Patent: Jun. 23, 2020

(54) METHOD AND APPARATUS FOR CORRECTING MULTIPATH OFFSET AND DETERMINING WIRELESS STATION LOCATIONS

(71) Applicant: GM Global Technology Operations LLC, Detroit, MI (US)

(72) Inventors: Bo Yu, Troy, MI (US); Fan Bai, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/518,945

(22) Filed: Jul. 22, 2019

(65) Prior Publication Data

US 2020/0059886 A1    Feb. 20, 2020

Related U.S. Application Data

(60) Provisional application No. 62/764,741, filed on Aug. 15, 2018.

(51) Int. Cl.
| | |
|---|---|
| *H04W 64/00* | (2009.01) |
| *H04W 88/08* | (2009.01) |
| *H04W 4/40* | (2018.01) |
| *H04B 17/318* | (2015.01) |
| *H04L 5/00* | (2006.01) |

(52) U.S. Cl.
CPC .......... *H04W 64/00* (2013.01); *H04B 17/318* (2015.01); *H04L 5/0048* (2013.01); *H04W 4/40* (2018.02); *H04W 88/08* (2013.01)

(58) Field of Classification Search
CPC ....... H04W 64/00; H04W 4/40; H04W 88/08; H04B 17/318; H04L 5/0048
USPC ...................................................... 455/456.1
See application file for complete search history.

(56) References Cited

U.S. PATENT DOCUMENTS

| | | | |
|---|---|---|---|
| 2014/0129027 A1* | 5/2014 | Schnittman | G05D 1/0219 700/253 |
| 2019/0023266 A1* | 1/2019 | Kouri | B60W 30/09 |
| 2019/0250243 A1* | 8/2019 | Jouaux | G01C 21/26 |

* cited by examiner

Primary Examiner — Inder P Mehra
(74) Attorney, Agent, or Firm — Cantor Colburn LLP

(57) ABSTRACT

Embodiments include methods, systems and computer readable storage medium for determining a location for one or more wireless stations or access points. The method includes receiving, by a processor, trace data from one or more vehicles. The method further includes performing, by the processor, a particle filtering analysis on the trace data. The method further includes determining, by the processor, a location for the one or more wireless stations or access points.

17 Claims, 5 Drawing Sheets

METHOD AND APPARATUS FOR CORRECTING MULTIPATH OFFSET AND DETERMINING WIRELESS STATION LOCATIONS

CROSS REFERENCE TO RELATED APPLICATION

This application claims the benefit of U.S. Provisional Patent Application Ser. No. 62/764,741 filed Aug. 15, 2018 which is incorporated herein by reference in its entirety.

INTRODUCTION

The subject disclosure relates to mapping and navigation, and more specifically to determining a location for a public wireless station using vehicle trace data.

Autonomous vehicles are automobiles that have the ability to operate and navigate without human input. Autonomous vehicles, as well as some non-autonomous vehicles, use sensors, such as cameras, radar, LIDAR, global positioning systems, and computer vision, to detect the vehicle's surroundings. Advanced computer control systems interpret the sensory input information to identify a vehicle's location, appropriate navigation paths, as well as obstacles and relevant signage. Some autonomous vehicles update map information in real time to remain aware of the autonomous vehicle's location even if conditions change or the vehicle enters an uncharted environment. Autonomous vehicles as well as non-autonomous vehicles increasingly communicate with remote computer systems and with one another using V2X communications—Vehicle-to-Everything, Vehicle-to-Vehicle (V2V), Vehicle-to-Infrastructure (V2I)).

SUMMARY

In accordance with one or more embodiments, a method determining a location for one or more wireless stations or access points is disclosed. The method includes receiving, by a processor, trace data from one or more vehicles. The method further includes performing, by the processor, a particle filtering analysis on the trace data. The method further includes determining, by the processor, the location for the one or more wireless stations or access points.

In accordance with one or more embodiments or the method embodiment above, the method can include determining a location of one or more vehicles using the location for the one or more wireless stations or access points.

In accordance with one or more embodiments or any of the method embodiments above, the particle filtering analysis can include generating or re-regenerating samples from the trace data, calculating and associating a weight with each of the samples, and iterating the generating or re-regenerating or the samples and the calculating and associating of the weight until a probability distribution of the samples is obtained.

In accordance with one or more embodiments or any of the method embodiments above, the weight calculation can include a multipath mitigation determination.

In accordance with one or more embodiments or any of the method embodiments above, the multipath mitigation determination can be based on Channel State Information.

In accordance with one or more embodiments or any of the method embodiments above, the multipath mitigation determination can be based on a received signal strength indication.

In accordance with one or more embodiments or any of the method embodiments above, the received signal strength indication can be used to infer line of sight conditions.

In accordance with one or more embodiments, a system for determining a location for one or more wireless stations or access points is disclosed. The system includes one or more vehicles. Each vehicle includes a first memory and a first processor coupled to the first memory. The system includes one or more cloud computers. Each cloud computer includes a second memory and a second processor coupled to the second memory. Each second processor is operable to perform receiving trace data from the one or more vehicles, performing a particle filtering analysis on the trace data, and determining the location for the one or more wireless stations or access points.

In accordance with one or more embodiments or the system embodiment above, each second processor can be operable to determine a location of one or more vehicles using the location for the one or more wireless stations or access points.

In accordance with one or more embodiments or any of the system embodiments above, the particle filtering analysis can include generating or re-regenerating samples from the trace data, calculating and associating a weight with each of the samples, and iterating the generating or re-regenerating or the samples and the calculating and associating of the weight until a probability distribution of the samples is obtained.

In accordance with one or more embodiments or any of the system embodiments above, the weight calculation can include a multipath mitigation determination.

In accordance with one or more embodiments or any of the system embodiments above, the multipath mitigation determination can be based on Channel State Information.

In accordance with one or more embodiments or any of the system embodiments above, the multipath mitigation determination can be based on a received signal strength indication.

In accordance with one or more embodiments or any of the system embodiments above, the received signal strength indication can be used to infer line of sight conditions.

In accordance with one or more embodiments, a non-transitory computer readable storage medium is disclosed. The non-transitory computer readable storage medium includes program instructions for determining a location for one or more wireless stations or access points embodied therewith. The program instructions are readable by a processor to cause the processor to perform receiving trace data from one or more vehicles, performing a particle filtering analysis on the trace data, and determining the location for the one or more wireless stations or access points.

In accordance with one or more embodiments or the non-transitory computer readable storage medium embodiment above, the program instructions readable by the processor to cause the processor to determine a location of one or more vehicles using the location for the one or more wireless stations or access points.

In accordance with one or more embodiments or any of the non-transitory computer readable storage medium embodiments above, the particle filtering analysis can include generating or re-regenerating samples from the trace data, calculating and associating a weight with each of the samples, and iterating the generating or re-regenerating or the samples and the calculating and associating of the weight until a probability distribution of the samples is obtained.

In accordance with one or more embodiments or any of the non-transitory computer readable storage medium embodiments above, the weight calculation can include a multipath mitigation determination.

In accordance with one or more embodiments or any of the non-transitory computer readable storage medium embodiments above, the multipath mitigation determination can be based on Channel State Information.

In accordance with one or more embodiments or any of the non-transitory computer readable storage medium embodiments above, the multipath mitigation determination can be based on a received signal strength indication.

In accordance with one or more embodiments or any of the non-transitory computer readable storage medium embodiments above, the received signal strength indication can be used to infer line of sight conditions.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
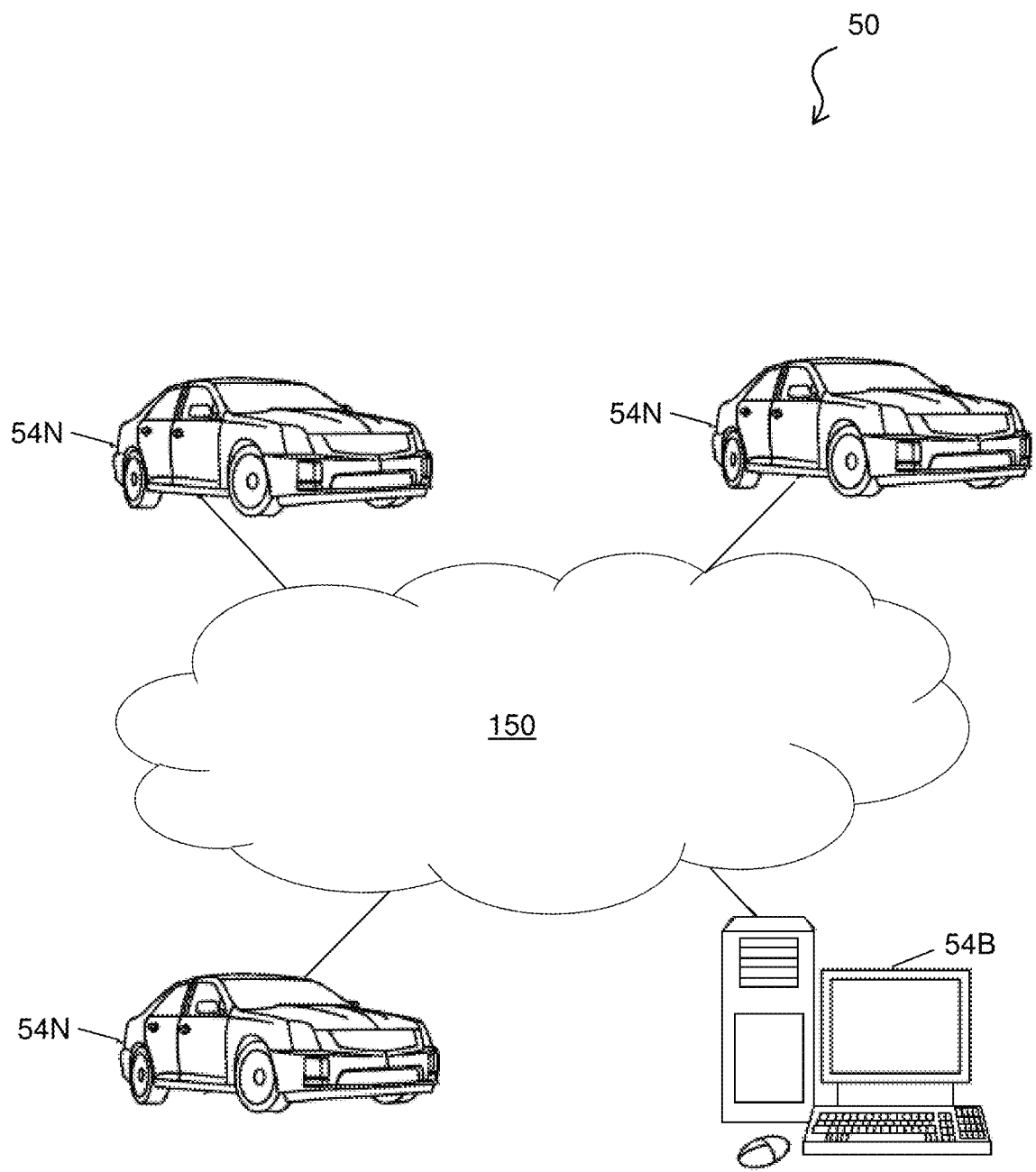
FIG. 1 is a computing environment according to one or more embodiments.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Recent years have seen a dramatic increase in the use of mobile platforms incorporating both wireless networking capabilities (e.g., IEEE 802.11 protocol standards, herein referred to as Wi-Fi) and global positioning system (GPS) capabilities. Such mobile platforms include, for example, mobile computing devices (such as laptop computers, tablet computers, smartphones, etc.) and various systems of transportation (automotive vehicles, buses, motorcycles, and the like). In instances where GPS information is not available, or when it is not desirable to enable the GPS capabilities of such mobile platforms (e.g., due to battery life concerns), the position of the mobile platform may be estimated using information relating to one or more network access points (e.g., Wi-Fi access points conforming to one or more of the IEEE 802.11 family of standards) within range of the mobile platform. That is, if it is determined that a mobile platform is within range of multiple access points with known geographical locations, and those ranges are known (e.g., through time-of-flight (ToF) measurements) the position of the mobile platform itself may be estimated based on the range information. The accuracy of such position estimates are limited, however, by the accuracy of the access point positions themselves. While obtaining location information for access points may be performed using vehicle data, such a method may be susceptible to errors due to receipt of multipath signals by the access point.

In accordance with an exemplary embodiment, FIG. 1 illustrates a computing environment 50 associated with a system for malicious basic safety message detection using an angle of arrival. As shown, computing environment 50 comprises one or more computing devices, for example, a server/Cloud 54B, and/or an automobile onboard computer system 54N incorporated into each of a plurality of autonomous or non-autonomous vehicles, which are connected via network 150. The one or more computing devices can communicate with one another using network 150.

The network 150 can be, for example, a cellular network, a local area network (LAN), a wide area network (WAN), such as the Internet and Wi-Fi, a dedicated short range communications network (for example, V2V communication (vehicle-to-vehicle), V2X communication (i.e., vehicle-to-everything), V2I communication (vehicle-to-infrastructure), and V2P communication (vehicle-to-pedestrian)), or any combination thereof, and may include wired, wireless, fiber optic, or any other connection. The network 150 can be any combination of connections and protocols that will support communication between server/Cloud 54B, and/or the plurality of vehicle on-board computer systems 54N, respectively.

The vehicle on-board computer systems 54N for each of the plurality of vehicles can include a GPS transmitter/receiver (not shown) which is operable for receiving location signals from a plurality of GPS satellites (not shown) that provide signals representative of a location for each of the mobile resources, respectively. In addition to the GPS transmitter/receiver, each vehicle associated with one of the plurality of vehicle on-board computer systems 54N may include a navigation processing system that can be arranged to communicate with a server/Cloud 54B through the network 150. Accordingly, each vehicle associated with one of the plurality of vehicle on-board computer systems 54N is able to determine location information and transmit that location information to the server/Cloud 54B or another vehicle on-board computer system 54N.

The vehicle on-board computer system 54N may also include one or more active and passive sensors (e.g., radar, LIDAR, cameras (internal and external), weather, longitudinal acceleration, voice recognition, or the like). The vehicle on-board computer system 54N may also include one or more microphones and a speech processing application.

Additional signals sent and received may include data (e.g., image data obtained from cameras associated with the vehicle on-board computer system 54N), communication, and/or other propagated signals (e.g., signals associated with LIDAR and/or radar). Further, it should be noted that the functions of transmitter and receiver can be combined into a signal transceiver.

The vehicle on-board computer system 54N and server/Cloud 54B may both include memory components that store high-definition map data and can also include processing components that process the high-definition map data. For example, each vehicle can store high-definition map data within a non-volatile memory. The vehicle on-board computer system 54N and server/Cloud 54B may both store the same or similar information related to map data and routing information.

When a cloud is employed instead of a server, the server/Cloud 54B can serve as a remote compute resource. The server/Cloud 54B can be implemented as a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

Figure 2:
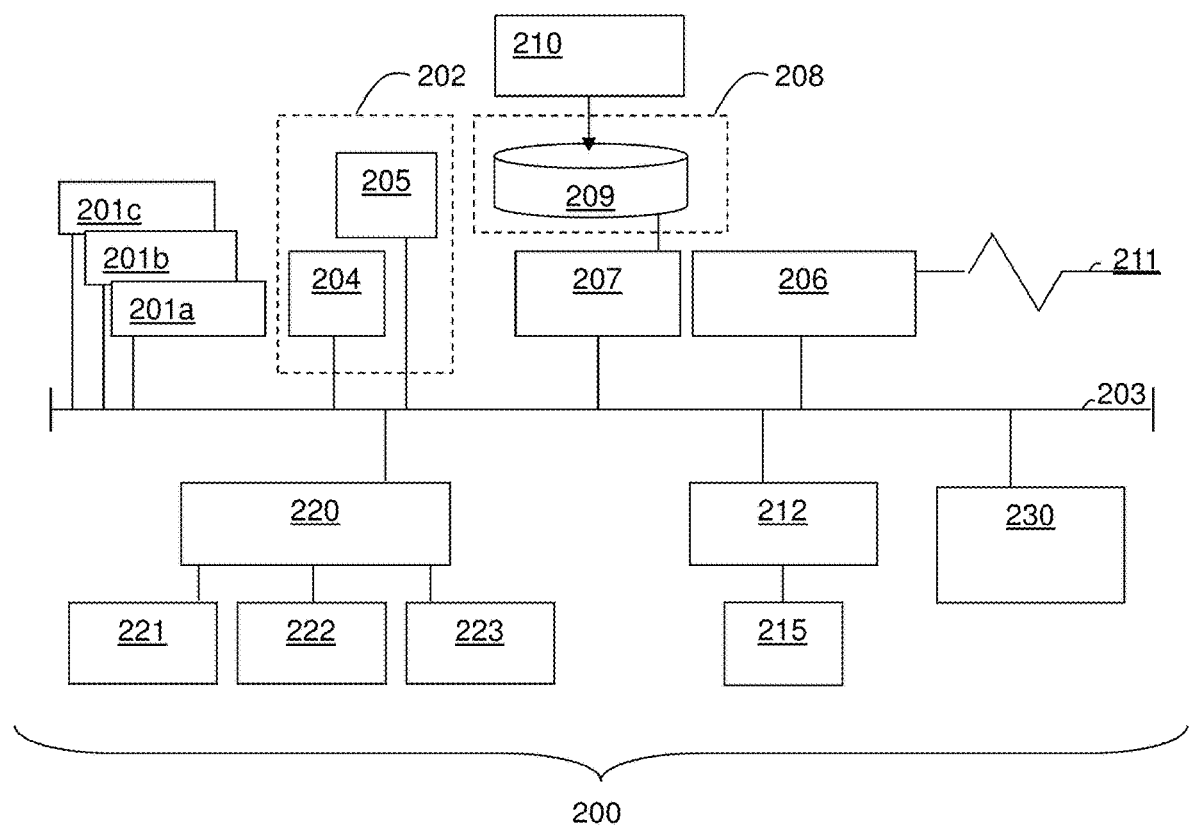
FIG. 2 is a block diagram illustrating one example of a processing system according to one or more embodiments.

In accordance with an exemplary embodiment, FIG. 2 illustrates a processing system 200 for implementing the teachings herein. The processing system 200 can form at least a portion of the one or more computing devices, such as server/Cloud 54B, and/or vehicle on-board computer system 54N. The processing system 200 may include one or more central processing units (processors) 201a, 201b, 201c, etc. (collectively or generically referred to as processor(s) 201). Processors 201 are coupled to system memory 202 and various other components via a system bus 203. The system memory 202 can include a read only memory (ROM) 204, can include a random access memory (RAM) 205; and can include a basic input/output system (BIOS), which controls certain basic functions of the processing system 200.

FIG. 2 further depicts a network adapter 206 and an input/output (I/O) adapter 207 coupled to the system bus 203. The I/O adapter 207 may be a small computer system interface (SCSI) adapter that communicates with a mass storage 208, which can include a hard disk 209 and/or other storage drive or any other similar component. An operating system 210 for execution on the processing system 200 may be stored in the mass storage 208. The network adapter 206 interconnects the system bus 203 with an outside network 211 enabling the processing system 200 to communicate with other such systems.

A display adaptor 212 can connect a screen 215 (e.g., a display monitor) to the system bus 203 by display adaptor 212, which may include a graphics adapter to improve the performance of graphics intensive applications and a video controller. In one embodiment, adapters 207, 206, and 212 may be connected to one or more I/O busses that are connected to the system bus 203 via an intermediate bus bridge. Suitable I/O buses for connecting peripheral devices such as hard disk controllers, network adapters, and graphics adapters typically include common protocols, such as the Peripheral Component Interconnect (PCI). Additional input/output devices are shown as connected to the system bus 203 via a user interface adapter 220. A keyboard 221, mouse 222, and speaker 223 can all be interconnected to the system bus 203 via the user interface adapter 220, which may include, for example, a Super I/O chip integrating multiple device adapters into a single integrated circuit.

The processing system 200 may additionally include a graphics-processing unit 230. Graphics processing unit 230 is a specialized electronic circuit designed to manipulate and alter memory to accelerate the creation of images in a frame buffer intended for output to a display. In general, graphics-processing unit 230 is very efficient at manipulating computer graphics and image processing, and has a highly parallel structure that makes it more effective than general-purpose CPUs for algorithms where processing of large blocks of data is done in parallel.

Thus, as configured in FIG. 2, the processing system 200 includes processing capability in the form of processors 201, storage capability including the system memory 202 and the mass storage 208, input means such as the keyboard 221 and the mouse 222, and output capability including the speaker 223 and the display 215. In one embodiment, a portion of the system memory 202 and the mass storage 208 collectively store the operating system 210 to coordinate the functions of the various components shown in FIG. 2.

Figure 3:
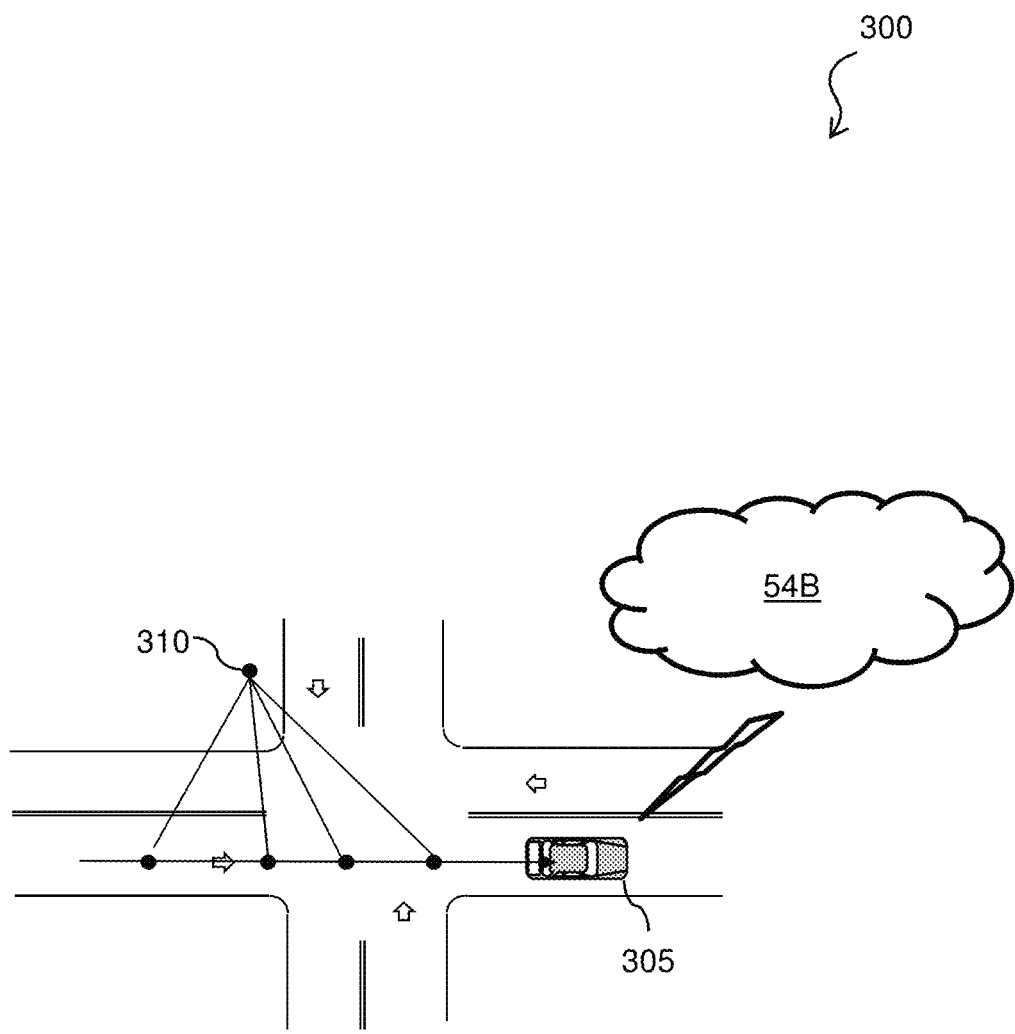
FIG. 3 depicts a route traversal according to one or more embodiments.

FIG. 3 depicts a route traversal 300 according to one or more embodiments. As a vehicle (e.g., vehicle 305), travels along a road network, the vehicle 305 can collect, send and receive information, which can be used to locate the vehicle on the road network and assist in the operation of the vehicle. The vehicle 305 can sensor data from the vehicle on-board computer system 54N to the server/Cloud 54B. For example, the vehicle 305 can collect and determine ToF distance measurements to one or more wireless stations or access points 310. ToF relates to measurements of the time it takes for a signal to travel between the vehicle 305 and the one or more wireless stations or access points 310. The ToF data can be used to triangulate a location associated with the vehicle 305. The ToF measurements can be acquired using any suitable Wi-Fi standard, for example, 802.11mc. The ToF distance measurements can be combined with other sensor data to form trace data.

The trace data can be sent from the vehicle on-board computer system 54N to the server/Cloud 54B using any suitable communications protocol, for example, Long-Term Evolution (LTE) wireless communications. The trace data can additionally include a list of data points in which each data point includes data collected by the vehicle 305 at a particular time (i.e., a timestamp). The data collected can include, for example, GPS coordinates, GPS errors, vehicle speed, vehicle yaw rate, ToF distance measurements, radio physical layer readings (such as a received signal strength indication (RSSI), Power-delay Profiling, other physical lay indicator ions, etc., such as Doppler drift, Doppler spread, coherence time, and coherence bandwidth), or the like.

Upon receipt of the trace data for vehicle 305, the server/Cloud 54B can analyze the trace data of vehicle 305, as well as the trace data of other vehicles to determine a location/position of wireless stations (e.g., one or more wireless stations or access points) along the road network. The server/Cloud 54B can determine positioning data for each vehicle, as well as perform a particle filtering analysis on the trace data to determine a location associated with a wireless station (e.g., one or more wireless stations or access points).

Figure 4:
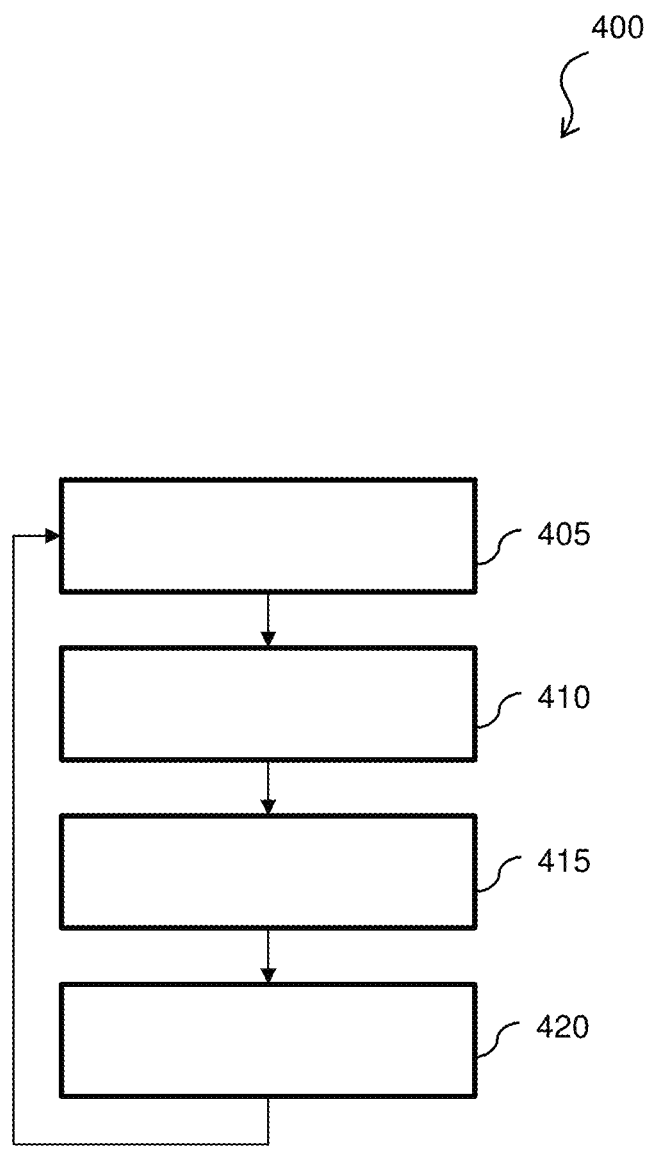
FIG. 4 depicts flow diagram of a method for particle filtering according to one or more embodiments.

FIG. 4 depicts a method 400 for particle filtering according to one or more embodiments. At block 405, Cloud 54B may include computer-readable instructions that, in response to execution by one or more processor(s), cause operations to be performed including receiving trace data having trace data points from one or more vehicles. At block 410, the Cloud 54B can re-generate particles/samples (samples) associated with each trace of associated trace data. Each sample can be associated with each signal transmission and/or receipt between a vehicle and a Wi-Fi location. At block 415, the server/Cloud 54 can calculate a weight for each sample.

A weight calculation can be based on Equation 1:

$$w^{[j]} = f(j, \text{trace}) \quad \text{Equation 1}$$

Note that weight for sample j can be a function of sample j and a trace of data points received from a vehicle. The weight function can be based on Equation 2:

$$w^{[j]} = \frac{1}{\sum_{i \in trace} \text{error}(i, j)} \quad \text{Equation 2}$$

where j is a sample and i is a data point for a vehicle. The error function is a function of measurement errors between sample j and data point i.

An exemplary error function can be based on Equation 3:

$$\text{error}(i, j) = \begin{cases} |m_i - x_j|^{2 \cdot GPSF_i}, & \text{if } (m_i - x_j) < 0 \\ |m_i - x_j|^{2 \cdot LOSF_i \cdot GPSF_i}, & \text{if } (m_i - x_j) > 0 \end{cases} \quad \text{Equation 3}$$

where $m_i$ is a ToF distance measurement for data point i, $x_j$ is a distance from sample to data point i, $GPSF_i$ is a GPS Signal Strength Factor for data point i ($GPSF_i \in [0,1]$, ]0—weak, 1—strong) and $LOSF_i$ is a Line-of-Sight Factor for data point i. The errors between sample j and data point i can be related to multipath signals. Note that the equations here may include variations to achieve the same technical objectives. Also, note that iterating the generating or re-regenerating or the samples (as described in block 410) and the calculating and associating of the weight (as described in block 415) until a probability distribution of the samples is obtained.

Multipath signals are signals that reach a receiving antenna (e.g., an antenna associated with the Wi-Fi) through two or more paths. Causes of multipath can include atmospheric ducting, ionospheric reflection and refraction, and reflection from water bodies, mountains and other objects. In an urban setting, the multipath signals can be caused by buildings, other vehicles or the like.

The GPSF can be retrieved from a GPS receiver of an associated vehicle and have normalized values ranging from 0 to 1, where 1 indicates a strong signal and 0 indicates a weak signal. The LOSF can have a range between 0 and 1 where 0 indicates that line of sight (LOS) signals are blocked and 1 indicates a strong LOS signal. Accordingly, the exemplary error function can represent a least-square fitting scenario in which LOSF=1 and GPSF=1.

If $(m_i - x_j) < 0$, the LOS is likely to be closer to 1. Accordingly, a least-square fitting is applied to the sample. If $(m_i - x_j) > 0$, the LOS is likely to be closer to 0, i.e., a no LOS (NLOS) measurement. Accordingly, a contribution to the weight of the sample is reduced exponentially.

The LOSF can be calculated using a variety of equations. A first exemplary LOSF calculation (i.e., an Energy of Direct Path calculation) can be according to Equation 4:

$$LOSF = \frac{EDP}{RSSI} \quad \text{Equation 4}$$

where EDP is an energy of direct path, which can be collected by a Wi-Fi chipset of a vehicle, attached to a data point, and uploaded to Cloud 54B. RSSI is a received signal strength indication. EDP can be derived from Channel State Information (CSI) associated with chipsets associated with an automobile onboard computer system 54N.

A second exemplary LOSF calculation (i.e., RRSI statistical learning calculation) can be according to Equation 5:

$$LOSF = \frac{\sigma_{rssi}}{\sigma_{rssi\_i}} \quad \text{Equation 5}$$

where $\sigma_{rssi}$ is a reference RSSI standard deviation and $\sigma_{rssi\_i}$ is the RSSI standard deviation at the position of data point i. $\sigma_{rssi}$ can be an empirical value based on large scale experiments. $\sigma_{rssi\_i}$ can be calculated using crowd-sourced RSSI measurements (i.e., get all RSSI readings from previously uploaded vehicle traces and calculate a variance of all RSSI readings centered at a position of data point i within a radius r). The second exemplary LOSF calculation is beneficial when there is need to identify affected by constant scatters, such as buildings, walls, etc.

A third exemplary LOSF calculation (i.e., Neighboring Measurement Verification (Displacement Limit)) can be according to Equation 6:

$$LOSF = \frac{m'_i}{m_i} \quad \text{Equation 6}$$

where $m_i'$ is a verified distance and $m_i$ is a distance measurement of data point i. The third exemplary LOSF calculation can entail getting all the verified distances for data points from previously uploaded traces, calculating data point i's verified distance:

$$m'_i = \max_{k \in N}(m'_k + d_{ki}),$$

N is me set of neighboring data points within a radius and saving the verified distance data point i for future use.

At block 420, the server/Cloud 54B outputs an estimated position (with respect to the weighted samples). For example, by mitigating multipath signals through the removal of the multipath signals from consideration when determining a Wi-Fi location, signal data used to determine Wi-Fi locations is improved and a more accurate Wi-Fi location can be established.

Figure 5:
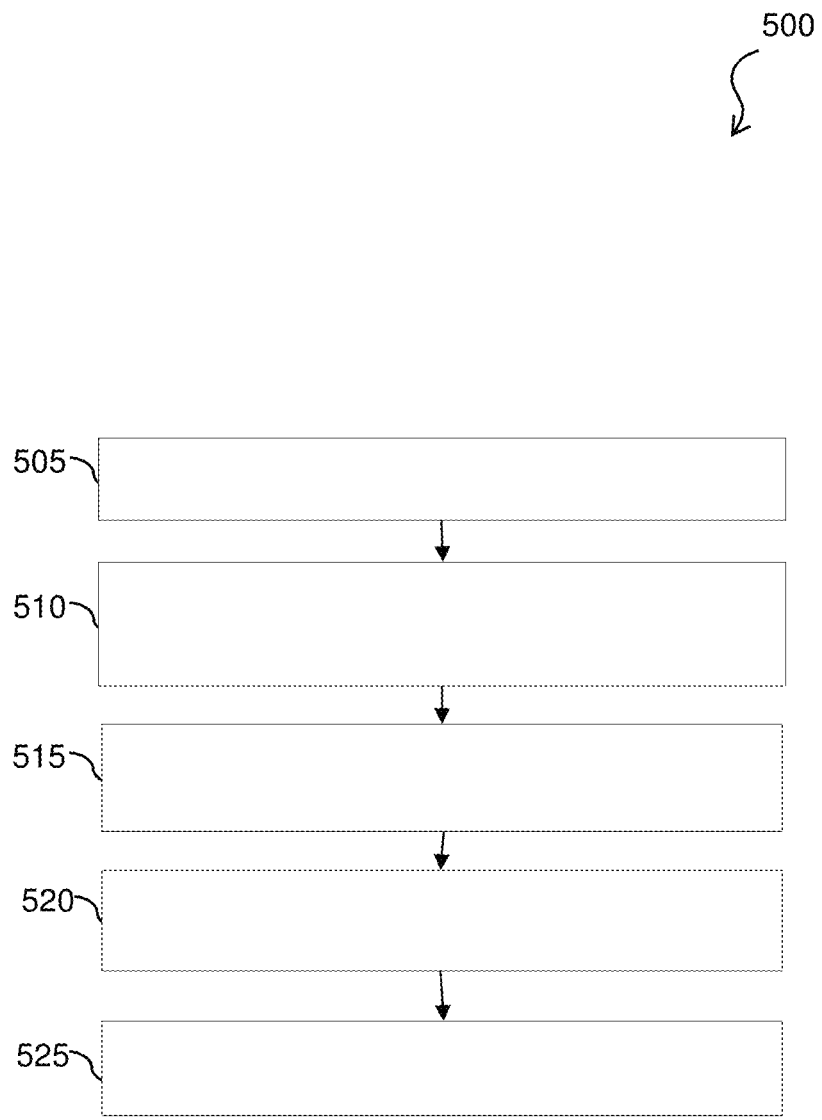
FIG. 5 depicts a flow diagram of a method for determining a location for a wireless station and using the location to determine a vehicle location according to one or more embodiments.

FIG. 5 depicts a flow diagram of a method 500 for determining a location for a wireless station (e.g., one or more wireless stations or access points) and using the location to determine a vehicle location according to one or more embodiments. At block 505, a computing device, for example, the server/Cloud 54B, can receive trace data from one or more vehicles. The received trace data can include a list of data points. Each data point can include timestamp information, GPS coordinates, GPS errors, vehicle speed, vehicle yaw rate, ToF distance measurements, radio physical layer readings (such as RSSI, Power-delay Profiling), etc. At block 510, the server/Cloud 54B performs a particle filtering analysis on the received trace data. The particle filtering analysis can weight samples associated with each trace and remove multipath signals from the received trace data. At block 515, the server/Cloud 54B can also calculate a Wi-Fi location based on a particle filtering analysis of the trace data. At block 520, the server/Cloud 54B can store the Wi-Fi location information. At block 525, the server/Cloud 54B can determine a location of one or more vehicles 305 using the stored Wi-Fi location information. Accordingly, location information for a vehicle can be determined despite GPS information not being available, or when it is not desirable to enable the GPS capabilities for the vehicle using Wi-Fi location information determined herein.

Accordingly, the embodiments disclosed herein describe a system that can leverage trace data between vehicles and Wi-Fi to determine a location for the Wi-Fi. The embodiments disclosed herein can utilize a Particle-Filter-based method to determine a position of a public wireless station. The embodiments disclosed herein can also utilize CSI information to mitigate an impact of a multipath offset when determining the position of the public wireless station. Embodiments disclosed herein can utilize crowd-sourced RSSI and/or ToF measurements information and vehicle displacement information to infer LOS conditions and mitigate multipath offset. Note that embodiments herein can extend the Particle-Filter-based method as other ToF data analytics are contemplated herein.

Technical effects and benefits of the disclosed embodiments include, but are not limited to improved location determinations for Wi-Fi. In addition, the improved Wi-Fi location information to locate vehicles when GPS is not available or when it is not desirable to enable the GPS capabilities of the vehicle.

The present disclosure may be a system, a method, and/or a computer readable storage medium. The computer readable storage medium may include computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a mechanically encoded device and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A method for determining a location for one or more wireless stations or access points, the method comprising:
   receiving, by a processor, trace data from one or more vehicles;
   performing, by the processor, a particle filtering analysis on the trace data; and
   determining, by the processor, the location for the one or more wireless stations or access points,
   wherein the particle filtering analysis comprises:
      generating or re-regenerating samples from the trace data;
      calculating and associating a weight with each of the samples; and
      iterating the generating or re-regenerating or the samples and the calculating and associating of the weight until a probability distribution of the samples is obtained.

2. The method of claim 1 further comprising determining a location of one or more vehicles using the location for the one or more wireless stations or access points.

3. The method of claim 1, wherein the weight calculation comprises a multipath mitigation determination.

4. The method of claim 3, wherein the multipath mitigation determination is based on Channel State Information.

5. The method of claim 3, wherein the multipath mitigation determination is based on a received signal strength indication.

6. The method of claim 5, wherein the received signal strength indication is used to infer line of sight conditions.

7. A system for determining a location for one or more wireless stations or access points, the system comprising:
   one or more vehicles, each comprising:
      a first memory, and
      a first processor coupled to the first memory; and
   one or more cloud computers, each comprising:
      a second memory, and
      a second processor coupled to the second memory;
   wherein each second processor is operable to perform:
      receiving trace data from the one or more vehicles;
      performing a particle filtering analysis on the trace data; and
      determining the location for the one or more wireless stations or access points,
   wherein the particle filtering analysis comprises:
      generating or re-regenerating samples from the trace data;
      calculating and associating a weight with each of the samples; and
      iterating the generating or re-regenerating or the samples and the calculating and associating of the weight until a probability distribution of the samples is obtained.

8. The system of claim 7, wherein each second processor is operable to determine a location of one or more vehicles using the location for the one or more wireless stations or access points.

9. The system of claim 7, wherein the weight calculation comprises a multipath mitigation determination.

10. The system of claim 9, wherein the multipath mitigation determination is based on Channel State Information.

11. The system of claim 9, wherein the multipath mitigation determination is based on a received signal strength indication.

12. The system of claim 11, wherein the received signal strength indication is used to infer line of sight conditions.

13. A non-transitory computer readable storage medium having program instructions for determining a location for one or more wireless stations or access points embodied therewith, the program instructions readable by a processor to cause the processor to perform:
receiving trace data from one or more vehicles;
performing a particle filtering analysis on the trace data; and
determining the location for the one or more wireless stations or access points,
wherein the particle filtering analysis comprises:
generating or re-regenerating samples from the trace data;
calculating and associating a weight with each of the samples; and
iterating the generating or re-regenerating or the samples and the calculating and associating of the weight until a probability distribution of the samples is obtained.

14. The computer readable storage medium of claim 13, wherein the program instructions readable by the processor to cause the processor to determine a location of one or more vehicles using the location for the one or more wireless stations or access points.

15. The computer readable storage medium of claim 13, wherein the weight calculation comprises a multipath mitigation determination.

16. The computer readable storage medium of claim 15, wherein the multipath mitigation determination is based on Channel State Information.

17. The computer readable storage medium of claim 15, wherein the multipath mitigation determination is based on a received signal strength indication.

* * * * *